3,819,630
Patented June 25, 1974

3,819,630
3-(1-PIPERAZINYLALKYL) - 2,4-QUINAZOLINE-DIONE COMPOUNDS AND METHODS FOR THEIR PRODUCTION
Robert F. Parcell, 3207 N. Wagner Road, Ann Arbor, Mich. 48103
No Drawing. Filed Aug. 21, 1972, Ser. No. 282,332
Int. Cl. C07d 51/30
U.S. Cl. 260—256.5 R
9 Claims

ABSTRACT OF THE DISCLOSURE

3 - (1 - piperazinylalkyl)-2,4-quinazolinediones further substituted at the 4-position of the piperazine ring by o-ethylthiophenyl, o-propylthiophenyl, or o-isopropylthiophenyl; N-methyl derivatives; and acid-addition salts. The compounds are pharmacological agents, especially central nervous system depressants of the type known as major tranquilizing agents. They exhibit cerebral depressant activity and suppress conditioned avoidance behavior. The N-methylated derivatives can be produced by methylation of the corresponding unmethylated compounds with an N,N-di(lower alkyl)formamide dimethyl acetal. The unmethylated compounds can be produced by a ring closure reaction of an o-aminobenzamide compound with phosgene. Starting materials can be produced from various piperazine derivatives.

SUMMARY AND DETAILED DESCRIPTION

The present invention relates to new quinazoline compounds. More particularly, the invention relates to new 3 - (1-piperazinylalkyl)-2,4-quinazolinedione compounds further substituted at position 4 of the piperazines ring; to N-methyl derivatives; to salts thereof; and to methods for the production of the foregoing compounds.

In the forms of their free bases, the compounds of the invention can be represented by the formula

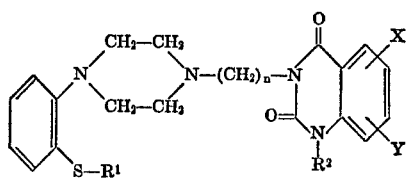

In this formula, $R^1$ represents ethyl, propyl, or isopropyl; $R^2$ represents hydrogen or methyl; $n$ represents 4, 5, or 6; and each of X and Y represents hydrogen or methoxy.

In accordance with the invention, the compounds of the invention wherein $R^2$ represents hydrogen (including free base and salt forms) can be produced by reacting an o-aminobenzamide of the formula

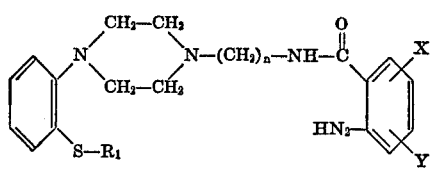

or a salt thereof with phosgene ($COCl_2$; where $R^1, n$, X, and Y are as defined before. The process is a ring closure reaction and hydrogen chloride is generated in the course of the reaction. Some suitable solvents for use in this process are hydrocarbons such as benzene, toluene, and xylene; chlorinated hydrocarbons such as chloroform, carbon tetrachloride, 1,2-dichloroethane, 1,1,2-trichloroethane, 1,1,2,2-tetracholroethane, and chlorobenzene; ethers such as dioxane and diethylene glycol dimethyl ether; and mixtures of these. A preferred solvent is 1,2-dichloroethane. The reactants can be used in approximately equimolar quantities although it is preferred to use an excess of phosgene. The time and temperature of the reaction are not critical and usual conditions are a temperature of from 50 to 150° C. or the reflux temperature of the solvent for from 1 to 16 hours. Preferred conditions are to add the phosgene at room temperature and then heat the reaction mixture at 80–120° C. for from 1–4 hours. The product is isolated as an acid-addition salt or as a free base following adjustment of the pH as necessary.

Starting materials required for use in the foregoing process can be prepared by any of a number of methods. For example, a 1-(o-alkylthiophenyl)piperazine of the formula

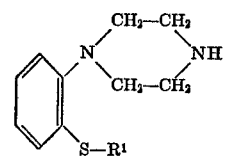

is reacted with a bromonitrile of the formula $$Br—(CH_2)_{n-1}—CN$$

in the presence of potassium carbonate and the product reduced with lithium aluminum hydride followed by hydrolysis to give a 1 - (aminoalkyl)-4-(o-alkylthiophenyl)piperazine compound of the formula

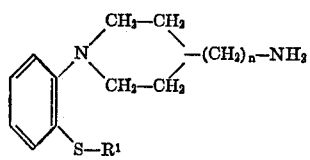

The latter product is reacted with an isatoic anhydride compound of the formula

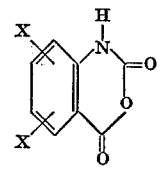

to produce an o-aminobenzamide compound employed as starting material in the above process. According to another sequence of reactions, a benzoic acid derivative of the formula

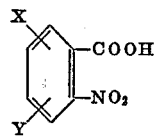

is converted to the acid chloride by reaction with thionyl chloride, and the acid chloride reacted with a 1-(aminoalkyl)-3-(o-alkylthiophenyl)piperazine compound of the formula shown above and the product of the reaction treated with base to produce an o-nitrobenzamide compound of the formula

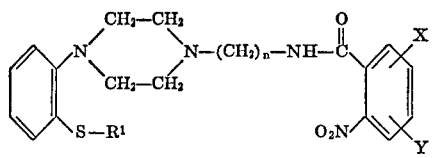

The latter product is reacted with hydrogen in the presence of Raney nickel catalyst to produce an o-aminobenzamide employed as starting material in the above process. In the above formulas $R^1$, $n$, X, and Y are as defined before.

Also in accordance with the invention, the compounds of the invention wherein $R^2$ represents methyl (including free base and salt forms) can be produced by reacting a compound of the invention wherein $R^2$ represents hydrogren (preferably in free base form) with an N,N-di(lower alkyl) formamide dimethyl acetal of the formula (lower alkyl)$_2$N—CH(OCH$_3$)$_2$

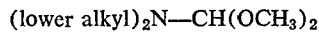

The N,N-di(lower alkyl)formamide dimethyl acetal functions as a methylating agent. The preferred reactant is N,N-dimethylformamide dimethyl acetal. Some examples of suitable solvents for the reaction are hydrocarbons such as benzene, toluene, and xylene; chlorinated hydrocarbons such as 1,2-dichloroethane, 1,1,2,2-tetrachloroethane, and chlorobenzene; ethers such as dioxane, tetrahydrofuran, and diethylene glycol dimethyl ether; and mixtures of these. A preferred solvent is dioxane. The time and temperature of the reaction are not critical and a temperature range of 50 to 150° C. or the reflux temperature of the solvent for from 1 to 48 hours is suitable. Preferred conditions are 80–120° C. for 16–24 hours. The reactants can be employed in approximately equimolar quantities although an excess of the N,N-di(lower alkyl)formamide dimethyl acetal is preferred. The product is isolated as the free base or as an acid-addition salt following adjustment of the pH as necessary.

The free bases of the invention form acid-addition salts with any of a variety of organic and inorganic acids. Pharmaceutically-acceptable acid-addition salts are formed with such acids as hydrochloric, hydrobromic, sulfuric, nitric, phosphoric, acetic, citric, tartaric, succinic, salicylic, maleic, malic, lactic, gluconic, and pamoic acids. In most cases, salts with one equivalent of acid are stable chemical derivatives. The free bases and their salt forms are interconvertible by adjustment of the pH. The free bases are produced by basification and the acid-addition salts are produced by acidification. They differ in solubility properties but, in general, are otherwise equivalent for the purposes of the invention.

The compounds of the invention can exist in anhydrous form as well as in solvated, including hydrated, forms. In general, the hydrated forms and the solvated forms with pharmaceutically-acceptable solvents are equivalent to the anhydrous or unsolvated form for the purposes of the invention.

The compounds of the invention are new chemical compounds of value as pharmacological agents and especially as central nervous system depressants. For example, they are cerebral depressant agents capable of suppressing motor activity. In the applicable test, the motor activity of rats is measured by placing each of a group of rats in a small wire cage suspended from a long, flexible, spiral spring in such a manner that it moves up and down in response to each movement or change in balance of the animal. The motion of each rat is cumulatively recorded. Treatment of a rat with desoxyephedrine alone causes an increase in motor activity and a resulting increase in the movement of the cage. In carrying out the procedure, a test compound is given by the subcutaneous or oral route and 15 minutes later a standard dose of desoxyephedrine, 2.4 mg./kg., is given subcutaneously. The rats are immediately placed in the cages and left for 2 hours. The effectiveness of a test compound as a cerebral depressant is rated according to the following scale in which percentages are percent suppression of desoxyephedrine-induced activity: 1+=15–30%; 2+=30–50%; 3+=50–75%; 4+=more than 75%. Some results obtained for representative preferred compounds of the invention are as follows. 3-[4-[4-[o-(propylthio)phenyl]-1-piperazinyl]butyl]-2,4(1H,3H) - quinazolinedione monohydrochloride; 4+ at 12.5 mg./kg., subcutaneous or oral administration. 1-methyl-3-[4-[4-[o-(propylthio)phenyl]-1-piperazinyl]butyl]-2,4(1H,3H)-quinazolinedione; 4+ at 50 mg./kg., subcutaneous or oral administration.

Another way in which the central nervous system depressant activity of the compounds of the invention can be demonstrated is by measuring their ability to suppress an avoidance behavior to which test animals have been conditioned. Activity in this type of test correlates with so-called major tranquilizer or anti-psychotic activity. Rats are trained to leave a test chamber in order to avoid an electrical shock delivered to the floor of the chamber. A compound is considered to be active in this test if it suppresses the conditioned behavior of the trained rats to leave the chamber before the electrical shock is delivered. In general, the compounds of the invention exhibit a good level of activity (median effective dose) in this test at dosages of 3–6 mg./kg., intraperitoneal route, a dosage range in which the known agent, chloropromazine, exhibits a similar level of activity. 6,7-dimethoxy-3-[4-[4-[o-(propylthio)phenyl] - 1 - piperazinyl]butyl]-2,4 (1H,3H)-quinazolinedione, however, exhibits a comparable degree of activity at a higher dosage level, somewhat greater than 12 mg./kg.

The invention is illustrated by the following examples.

EXAMPLE 1

Phosgene (11 g.) is passed into a solution of 32.7 g. of o-amino-N-[4-[4-[o-(propylthio)phenyl] - 1 - piperazinyl]butyl]benzamide in 250 ml. of 1,2-dichloroethane. A bulky precipitate forms. The mixture is diluted with 50 ml. of N,N-dimethylformamide and heated at 90–100° C. for 3 hours. The resulting solution is evaporated under reduced pressure to remove the 1,2-dichloroethane and the residue is diluted successively with 50 ml. of methanol, 50 ml. of 20% sodium hydroxide solution, and one liter of water, while stirring vigorously. The insoluble product is collected on a filter, washed with water, and dried. It is 3-[4-[4-[o-(propylthio)phenyl] - 1 - piperazinyl]butyl]-2,4(1H,3H)-quinazolinedione; m.p. 151–153° C. after crystallization from toluene-heptene. A solution of this free base in isopropyl alcohol is treated with a slight excess of dry hydrogen chloride and the insoluble product is collected on a filter. It is the monohydrochloride salt; m.p. 205–207° C. after crystallization from absolute ethanol. A salt with citric acid is obtained by reacting the free base with citric acid in methanol solution.

EXAMPLE 2

A solution of o-amino-N-[5-[4-[o-(propylthio)phenyl]-1-piperazinyl]pentyl]benzamide is prepared *in situ* by adding 16.5 g. of isatoic anhydride to a solution of 32.1 g. of 1-(5-aminopentyl)-4-(o-propylthiophenyl)piperazine in 250 ml. of 1,2-dichloroethane and heating and stirring the mixture at 80–90° C. for 1½ hours. The solution is cooled to 20° C. and 11 g. of phosgene is added. This reaction mixture is stirred and heated at reflux for 4 hours and then evaporated under reduced pressure. The residue is shaken with 1500 ml. of ether and excess dilute aqueous sodium hydroxide until solution is essentially complete. The organic phase is separated, dried, stirred with charcoal, and filtered. The filtrate is evaporated to a volume of 300 ml. and cooled. The insoluble product is collected on a filter, washed with ether and with petroleum ether, and dried. It is 3-[5-[4-[o-

(propylthio)phenyl - 1 - piperazinyl]pentyl]-2,4(1H,3H)-quinazolinedione; m.p. 128–131° C. The following additional products are prepared similarly.

From o-amino-N - [6-[4-[o-(propylthio)phenyl]-1-piperazinyl]hexyl]benzamide (prepared in situ from 33.5 g. of 1-(6-aminohexyl) - 4 - (o-propylthiophenyl)piperazine), the product is 3-[6-[4-[o-(propylthio)phenyl]-1-piperazinyl]hexyl]-2,4(1H,3H)-quinazolinedione. A solution of this free base in isopropyl alcohol is treated with a slight excess of dry hydrogen chloride and the insoluble product is collected on a filter. It is the monohydrochloride salt; m.p. 116–148° C. after crystallization from isopropyl alcohol-ether (product obtained as a hydrate).

From o-amino-N-[4-[o-(isopropylthio)phenyl]-1-piperazinyl]butyl]benzamide (prepared in situ from 30.7 g. of 1-(4-aminobutyl) - 4 - (o-isopropylthiophenyl)piperazine), the product is 3-[4-[4-[o-(isopropylthio)phenyl]-1-piperazinyl]butyl] - 2,4(1H,3H) - quinazolinedione. A solution of this free base in isopropyl alcohol is treated with a slight excess of dry hydrogen chloride and the insoluble product is collected on a filter. It is the monohydrochloride salt; m.p. 219–220° C. after crystallization from methanol.

From o-amino-N-[4-[4-[o-(ethylthio)phenyl]-1-piperzinyl]butyl]benzamide (prepared in situ from 29.3 g. of 1-(4 - aminobutyl)-4-(o-ethylthiophenyl)piperazine), the product is 3-[4-[4-[o-(ethylthio)phenyl]-1-piperazinyl]butyl]-2,4-(1H,3H)-quinazolinedione. A solution of this free base in isopropyl alcohol is treated with a slight excess of dry hydrogen chloride and the insoluble product is collected on a filter. It is the monohydrochloride salt; m.p. 239–245° C. after crystallization from methanol.

EXAMPLE 3

A solution of crude 2-amino-3-methoxy-N-[4-[4-[o-(propylthio)phenyl]-1-piperazinyl]butyl]benzamide (prepared as described below from 19.7 g. of 3-methoxy-2-nitrobenzoic acid) in 250 ml. of 1,2-dichloroethane is treated with 11 g. of phosgene, and the resulting mixture is stirred and heated at reflux for 4 hours and then evaporated under reduced pressure. The residue is shaken with 250 ml. of toluene and excess dilute aqueous sodium hydroxide until solution is essentially complete. The organic phase is separated, dried, concentrated to a volume of 150 ml., and diluted with petroleum ether. The insoluble product is collected on a filter. It is 8-methoxy-3-[4-[4-[o - (propylthio)phenyl] - 1 - piperazinyl]butyl] - 2,4-(1H,3H)-quinazolinedione; m.p. 137–139° C. after crystallization from toluene-petroleum ether. The product prepared similarly from 2-amino-4,5-dimethoxy-N-[4-[4-[o-(propylthio)phenyl] - 1 - piperazinyl]butyl]benzamide is 6,7-dimethoxy-3-[4-[4-[o-(propylthio)phenyl] - 1 - piperazinyl]butyl]-2,4(1H,3H)-quinazolinedione; m.p. 164–166° C. after crystallization from ethanol.

The starting materials can be obtained as follows. A mixture of 19.7 g. of 3-methoxy-2-nitrobenzoic acid and 50 ml. of thionyl chloride is heated at 90–100° C. until gas evolution ceases. Excess thionyl chloride is removed by distilaltion under reduced pressure and the residue of 3-methoxy-2-nitrobenzoyl chloride is dissolved in 200 ml. of dichloromethane and added with stirring and cooling to a solution of 30.7 g. of 1-(4-aminobutyl)-4-(o-propylthiophenyl)piperazine in 300 ml. of dichloromethane. The solvent is evaporated under reduced pressure and the residue is shaken with 250 ml. of toluene and excess dilute aqueous sodium hydroxide until solution is essentially complete. The organic phase is separated, dried, and evaporated under reduced pressure to give a residue of 3-methoxy - 2 - nitro-N-[4-[4-[o-(propylthio)phenyl]-1-piperazinyl]butyl]benzamide as an oil. A mixture of this oil with 300 ml. of methanol, 100 ml. of tetrahydrofuran, and 2 g. of Raney nicked catalyst is shaken at room temperature with hydrogen at 50 pounds per square inch pressure until 3 molecular equivalents of hydrogen have been absorbed. The catalyst is removed by filtration and the filtrate evaporated under reduced pressure to give 2-amino - 3 - methoxy-N-[4-[4-[o-(propylthio)phenyl]-1-piperazinyl]butyl]benzamide used as starting material in the above procedure. Similarly, by substituting 22.7 g. of 3,4-dimethoxy-6-nitrobenzoic acid for the 3-methoxy-2-nitrobenzoic acid, the product is 2-amino-4,5-dimethoxy-N-[4-[4-[o-(propylthio)phenyl] - 1 - piperazinyl]butyl]benzamide.

EXAMPLE 4

A solution of 30 g. of 3-[4-[4-[o-(propylthio)phenyl]-1-piperazinyl]butyl] - 2,4(1H,3H) - quinazolinedione and 25 g. of N,N-dimethylformamide diethyl acetal in 100 ml. of dioxane is heated at reflux for 18 hours and then evaporated under reduced pressure. The residue is dissolved in 250 ml. of toluene and the solution is washed with water, dried, concentrated to a volume of 125 ml., and diluted with excess petroleum ether. The insoluble product is collected on a filter. It is 1-methyl-3-[4-[4[o-(propyltsio)phenyl] - 1 - piperazinyl]butyl]-2,4(1H,2H)-qninazolinedione; m.p. 98–99° C. after crystallization from toluene-petroleum ether. Hydrochloride and citrate salts are obtained by reacting the free base with, respectively, hydrogen chloride in isopropyl alcohol and citris acid in methanol.

By the foregoing general procedure, but substituting 19 g. of 6,7 - dimethoxy-3-[4-[4-[o-(propylthio)phenyl]-1-piperazinyl]butyl]2,4(1H,3H)-quinazolinedione, 15 g. of N,N-dimethylformamide dimethyl acetal, and 50 ml. of dioxane, the product obtained is 6,7-dimethoxy-1-methyl-3-[4-[4-[o-propylthio)phenyl] - 1 - piperazinyl]butyl]-2,4-(1H,3H)-quinazolinedione; m.p. 140–142° C. after crystallization from ethyl-acetate. Hydrochloride and citrate salts are prepared as described above.

STARTING MATERIALS

The preparation for some of the starting materials has been described in the examples to which they pertain. Other starting materials and intermediates can be prepared as described below.

A mixture of 236 g. of 1-(o-propylthiophenyl)piperazine, 155 g. of 4-bromobutyronitrile, 200 g. of anhydrous potassium carbonate, and 800 ml. of 2-butanone is stirred and heated at reflux for 16 hours, then cooled and filtered. The filtrate is evaporated under reduced pressure and the residue is dissolved in one liter of ether. The ether butyronitrile, is washed with water, dried thoroughly, and added slowly to a stirred slurry of 42 g. of lithium aluminum hydride in 2 liters of ether. The resulting mixture is stirred and heated at reflux for 4 hours, then cooled, and treated successively with 44 ml. of water, 33 ml. of 20% aqueous sodium hydroxide, and 157 ml. of water. The mixture is filtered and the filtrate evaporated to give a residue of 1-(4-aminobutyl) - 4 - (o-propylthiophenyl)piperazine as an oil which is purified by distillation under reduced pressure; b.p. 158–163° C. at 0.08 mm. The following additional products are obtained by making the indicated substitutions in the foregoing procedure. From 236 g. of 1-(o-isopropylthiophenyl)piperazine, the product is 1-(4-aminobutyl)-4-(o-isopropylthiophenyl)piperazine; b.p. 170–172° C. at 0.4 mm. From 222 g. of 1-(o-ethylthiophenyl)piperazine, the product is 1-(4-aminobutyl) - 4 - (o-ethylthiophenyl)piperazine; b.p. 150–152° C. at 0.1 mm. From 236 g. of 1-(o-propylthiophenyl)piperazine and 185 g. of 6-bromohexanenitrile (6-bromocapronitrile), the product is 1-(6-aminohexyl)-4-(o-propylthiophenyl)piperazine; b.p. 176–180° C. at 0.1 mm.

Isatoic anhydride (16.5 g.) is added to a solution of 30.7 g. of 1-(4-aminobutyl)-4-(o-propylthiophenyl)piperazine in 200 ml. of tetrahydrofuran. The mixture is allowed to stand at room temperature with occasional stirring for 30 minutes, and then heated at 90–100° C. for 30 minutes. The resulting solution is evaporated under reduced pressure to give a residue of o-amino-N-[4-[4-[o-(propylthio)phenyl]-1-piperazinyl]butyl]benzamide; m.p.

75–79° C. after crystallization from toluene-petroleum ether.

What is claimed is:

1. A member of the class consisting of compounds of the formula

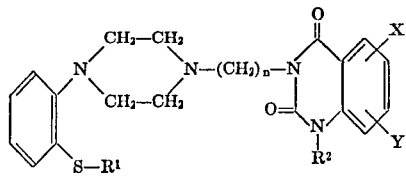

and pharmaceutically acceptable acid-addition salts thereof; where $R^1$ represents ethyl, propyl, or isopropyl; $R^2$ represents hydrogen or methyl; $n$ represents 4, 5, or 6; and each of X and Y represents hydrogen or methoxy.

2. A compound according to claim 1 which is 3-[4-[4-[o-(propylthio)phenyl] - 1 - piperazinyl]butyl] - 2,4-(1H,3H)-quinazolinedione.

3. A compound according to claim 1 which is an acid-addition salt of 3 - [4-[4-[o-(propylthio)phenyl]-1-piperazinyl]butyl]-2,4(1H,3H)-quinazolinedione.

4. A compound according to claim 3 which is 3-[4-[4-[o-(propylthio)phenyl] - 1 - piperazinyl]butyl] - 2,4-(1H,3H)-quinazolinedione monohydrochloride.

5. A compound according to claim 1 which is 1-methyl-3-[4-[4-[o-(propylthio)phenyl] - 1 - piperazinyl]butyl]-2,4(1H,3H)-quinazolinedione.

6. A compound according to claim 1 which is 6,7-dimethoxy - 1 - methyl - 3 - [4-[4-[o-(propylthio)phenyl]-1 - piperazinyl]butyl]-2,4(1H,3H)-quinazolinedione.

7. Process for the production of compounds as defined in claim 1 wherein $R^2$ represents hydrogen, which comprises reacting an o-aminobenzamide of the formula

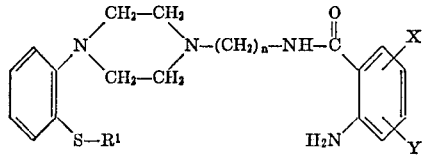

or a salt thereof with phosgene, and isolating the product as the free base or as a salt; where $R^1$, $n$, X, and Y are as defined in claim 1.

8. Process for the production of compounds as defined in claim 1 wherein $R^2$ represents methyl, which comprises reacting a compound of the same general formula wherein $R^2$ represents hydrogen, with an N,N-di(lower alkyl) formamide dimethyl acetal, and isolating the product as the free base or as a salt.

9. Process according to claim 8 wherein the N,N-di-(lower alkyl)formamide dimethyl acetal is N,N-dimethylformamide dimethyl acetal.

References Cited
UNITED STATES PATENTS 3,637,700   1/1972   Gabel et al. _____ 260—256.5 R
3,705,899   12/1972  Regnier et al. ____ 260—256.5 R RICHARD J. GALLAGHER, Primary Examiner U.S. Cl. X.R.

260—268 PH; 424—200, 232, 251